United States Patent Office 2,728,773
Patented Dec. 27, 1955

2,728,773
MANUFACTURE OF CITRAZINIC ACID

Manuel M. Baizer, Newark, N. J., assignor to The New York Quinine and Chemical Works, Inc., New York, N. Y.

No Drawing. Application June 12, 1953,
Serial No. 361,401

4 Claims. (Cl. 260—295)

My invention relates to an improvement in the manufacture of citrazinic acid from citric acid, and more particularly it is concerned with an improvement in said manufacture which makes it possible to produce citrazinic acid from citric acid in bulk by a simple and economical process.

A number of methods for the preparation of citrazinic acid from citric acid have been described which, however, have some substantial disadvantages for large scale production. For example, citric acid has been esterified with methanol or ethanol in the presence of hydrochloric acid as catalyst, the resulting triester has been isolated and then converted, by treatment with concentrated ammonia, into the triamide which, in turn, was isolated and then treated with 70 to 75% sulfuric acid to obtain the citrazinic acid or a mixture thereof with the amide. Or the citric acid triethylester was acetylated and the acetylation product treated with concentrated ammonia to obtain citrazinic acid. The use of hydrochloric acid in production work is troublesome and the acid corrodes the equipment. Moreover, the isolation of several intermediates required by these methods makes the overall procedure cumbersome and expensive. In another method, citric acid has been dehydrated to form aconitic acid which was then used as initial material for the process, but this procedure is necessarily unsatisfactory because the dehydration of citric acid gives only 50% aconitic acid. In still another method, acetanhydrocitric acid was prepared from citric acid and acetylchloride and then heated with concentrated ammonia; it yielded only 35 to 40% of citrazinic acid. The use of acetanhydrocitric acid is wasteful of large quantities of acetylchloride because an excess of the chloride must be employed in the reaction.

It is therefore an object of my invention to develop a better method for the manufacture of citrazinic acid from the citric acid and, in particular, it is an object of my invention to find a method which gives the desired results with greater ease and economy of operation, and which uses a minimum of steps and can be carried out in standard equipment, in order to make the synthesis practical for production purposes. Other objects will be apparent from the following description of my invention.

I have discovered that these objects can be fully accomplished and that it is possible to produce citrazinic acid from citric acid, without the isolation of intermediates and the use of expensive and corrosive reagents, if citric acid is esterified with a water-soluble lower alcohol in the presence of an organic sulfonic acid as the catalyst. The reaction is stopped when two carboxyl groups of citric acid have been esterified. Titration studies involving the rate of disappearance of carboxyl groups have indicated that two carboxyls are esterified relatively rapidly; the product isolated from a reaction which was interrupted at the conclusion of this rapid phase, gave no depression in melting point when mixed with the 1.3-dimethyl citric acid ester described by Schroeter and Schmitz (observed melting point 115-118°), Berichte 35, 2085 (1902).

The reaction mixture containing the diester was directly treated with concentrated ammonia, and this solution was then reacted with alkali to form a citrazinic acid salt which was converted to citrazinic acid by acidification. The entire process can be represented by the following main reaction scheme:

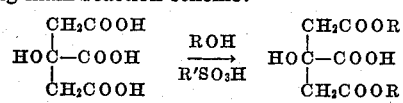

where R = lower alkyl
R' = alkyl or p-tolyl

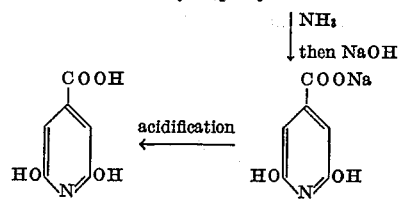

The following examples illustrate my invention:

*Examples 1.*—Anhydrous citric acid, 57.6 g.; p-toluenesulfonic acid monohydrate, 1,5 g.; and 75 ml. of anhydrous methanol were heated under reflux with stirring. A clear solution was obtained after about 10 minutes and the stirring was discontinued, but refluxing continued for a total of about 2.5 hours. The reaction mixture was transferred while warm, to an autoclave, 300 cc. of concentrated ammonia was added and the mixture heated at 120 to 130° C. for 2 hours. It was then cooled somewhat, the excess ammonia vented, 35 g. sodium hydroxide added and the mixture concentrated to 350 to 400 ml. in the course of about 5 hours. It was then cooled somewhat and filtered. The filtrate was brought to about 80° C., stirred well, and 60 cc. of 50% sulfuric acid was added cautiously. The pH should be less than 3. The mixture was finally cooled overnight in ice water, filtered, the filter cake slurry washed with cold water and dried at 120-125° C. to constant weight. Overall yield of crude citrazinic acid: 20.4 g. (43.7%) of a brown colored crude product. A lighter colored product can be obtained by dissolving the crude product in warm 75% sulfuric acid and pouring the solution with stirring into cold water. The precipitated citrazinic acid is filtered off, washed with water and dried. The recovery is about 95% of a light brown product.

*Example 2.*—In another experiment, 38.4 g. anhydrous citric acid, 38.4 g. methylalcohol and 1.0 g. alkane sulfonic acids were reacted and further treated as described in Example 1. The results were similar to those obtained in Example 1. The alkane sulfonic acids were a mixture of methane-, ethane-, and propane sulfonic acids, the average composition of the mixture being that of ethane sulfonic acid.

The crude citrazinic acid thus obtained is suitable for conversion into 2, 6-dichloro-isonicotinic acid. While any water-soluble lower aliphatic alcohol can be used for my new esterification process, I prefer to employ methanol or ethanol. For use as catalysts I have specifically described para-toluene sulfonic acid and a mixture of methanesulfonic acid, ethanesulfonic acid and propane sulfonic acid, the average composition of the mixture being that of ethanesulfonic acid. As far as I am aware the prior art does not suggest the use of organic sulfonic acids as catalysts for the esterification of citric acid in the manner described here. The organic sulfonic acid catalyst is preferably employed in the smallest effective amounts, as after esterification it remains present in the reaction mixture which is then directly submitted to treatment with ammonia as described, and should not be present in amounts large enough to interfere with that treatment. Instead of using sodium hydroxide, I can employ any 2,728,773